Nov. 29, 1966 H. V. MAY 3,288,279

BLISTER PACKAGE FOR ELECTRICAL COMPONENTS

Filed Oct. 10, 1961 2 Sheets-Sheet 1

INVENTOR

Harold V. May

BY Connolly and Hutz

ATTORNEY

BLISTER PACKAGE FOR ELECTRICAL COMPONENTS

Filed Oct. 10, 1961 2 Sheets-Sheet 2

INVENTOR

Harold V. May

BY Connolly and Hutz

ATTORNEYS

United States Patent Office 3,288,279

Patented Nov. 29, 1966

3,288,279

BLISTER PACKAGE FOR ELECTRICAL COMPONENTS

Harold V. May, Pittsfield, Mass., assignor to Sprague Electric Company, North Adams, Mass., a corporation of Massachusetts Filed Oct. 10, 1961, Ser. No. 144,089
8 Claims. (Cl. 206—56)

The present invention relates to a transparent blister type package for individually packaging electrical components, such as capacitors, which have a cylindrical or otherwise expanded body portion with a wire lead extending from each end thereof or with the wire leads extending from only one end thereof. In addition, the invention relates to a method for assembling the above package with the electrical component installed therein.

In assembling complex electrical systems for missiles, computers and other units, a large number of electrical components, such as capacitors, resistors, etc. are used. Different size capacitors are used throughout these systems being fabricated to handle generally limited capacity ranges. In other words, a single type capacitor cannot be uniformly used throughout the electrical system and it is very important that the correct size capacitor be installed at the particular required locations.

Heretofore, capacitors of all sizes have been shipped to the user in bulk form whereby the lead wires may easily become kinked during handling, shipping and installing since they are not protected. It is common practice to ship components of different size or ratings in the same size case. Therefore, they can easily become intermixed as to their rating through negligence or carelessness of the workers installing the electrical system.

In addition to the above, it has been necessary to individually handle each capacitor for testing the same prior to its being incorporated into the electrical system. The component was thus subject to further abuse by handling the same during the testing period.

Furthermore, the identifying characteristics or specifications of the electrical component were determined by the installer only by close examination of the printed matter thereon. This was difficult to determine especially with small or miniature components.

It is, therefore, one object of the invention to provide a new and novel transparent blister type package for electrical components, such as capacitors.

Still another object of the invention is to provide a blister type package of the above object wherein the electrical component can remain in its package after having been tested and until just before installation in the electrical system.

Another object of the invention is to provide individual cardboard boards or panels made up of a plurality of individual packages which individual packages are joined together in continuous formation by perforated tear-apart seams.

Another object is to provide a package of the above objects wherein the specifications of the component are printed in bold and easy to see letters printed directly on the package.

Another object of the invention is to provide a method for assemblying the packages with the electrical components housed therein.

Other objects and advantages of the invention will become more apparent from a study of the following description and drawings wherein.

Figure 1:
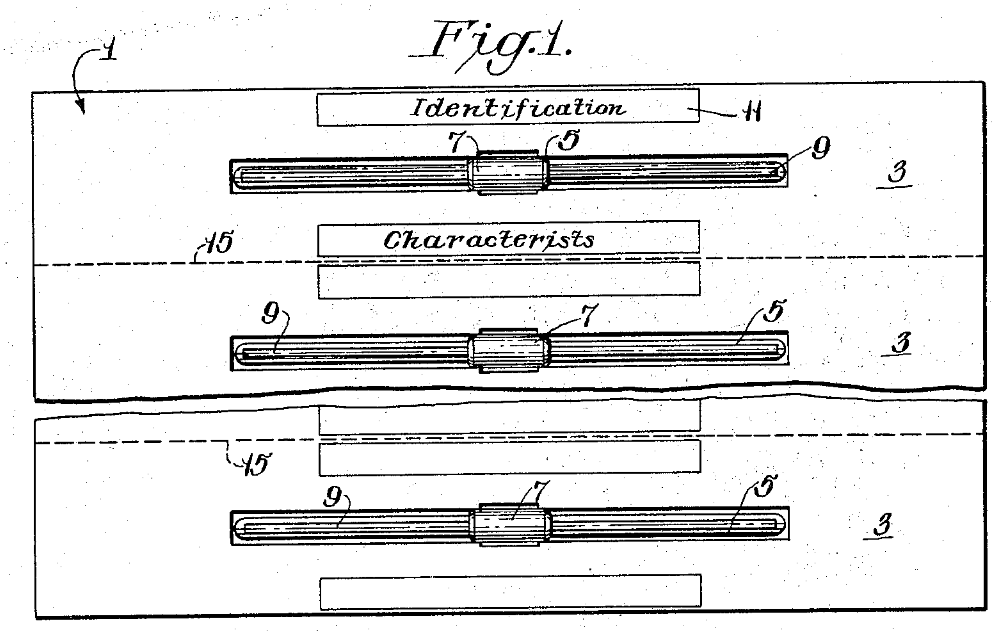
FIGURE 1 is a top plan view of the packages as they appear in their manufactured form showing a panel of a plurality of individual packages being joined together in continuous manner by perforated tear-apart seams.

As seen in FIGURE 1, there is provided a panel assembly 1 of individual but connected packages 3, each of which includes a transparent blister 5 having a central expanded portion and elongated ends, which houses the electrical component 7 having wire leads 9. The characteristics of the component 7 are plainly printed in identification areas 11. The individual packages 3 are held together in the panel 1 by perforated tear seams 15.

As shown, the blister is of a shape to accommodate a component having co-axial wire leads. However, by suitable shaping of the blister, it can be formed to accommodate components having both leads extending from one end only of the component.

Figure 2:
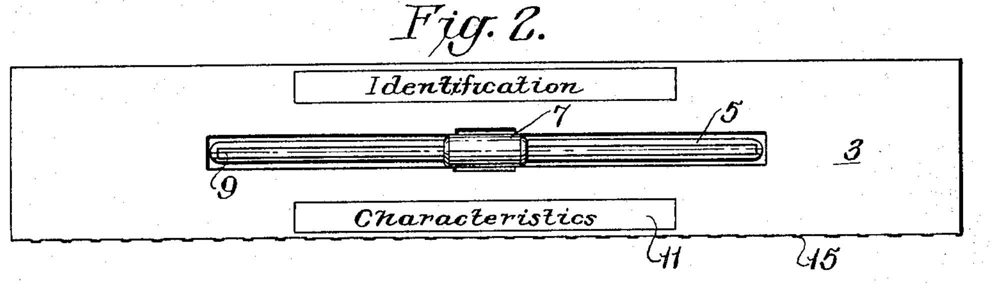
FIGURE 2 is a top view of an individual package after it has been separated from the panel of FIGURE 1.

An individual package 3 which has been separated from the panel assembly 1 is shown in FIGURE 2.

Figure 3:
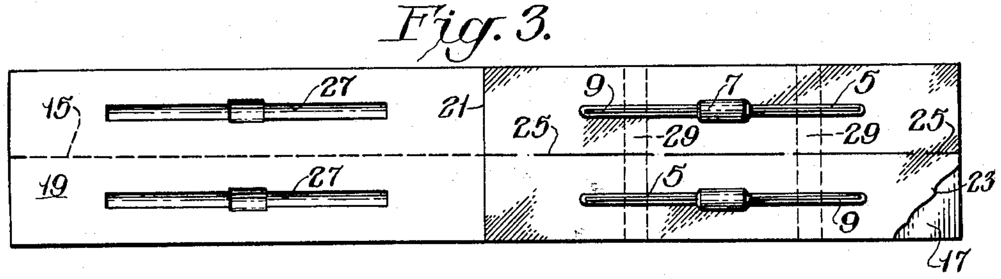
FIGURE 3 is an open view of the package showing the top and bottom sections of cardboard panels formed from a folded sheet of cardboard with the plastic blister material which houses the electrical component affixed to the bottom section.

FIGURE 3 shows the internal construction of the panel assembly 1. As seen here, the panel 1 is formed of backing sheet 17 and a front sheet 19 which are formed preferably from a single sheet of cardboard and folded along fold line 21. The back sheet 17 has perforated tear seams which correspond to or lie along the seam lines 15 formed in the front sheet 19.

As shown in FIGURE 3, a sheet 23 of relatively rigid clear plastic material into which the blisters 5 are formed by a suitable molding process, such as vacuum molding, is positioned against the back sheet 17 of the panel assembly 1 so that when the front sheet 19 is folded over the back sheet, the plastic sheet will lie therebetween. The size of the plastic sheet 23 corresponds substantially to the size of the back cardboard sheet 17.

Still referring to FIGURE 3, it is seen that the front sheet 19 has elongated slots 27 cut out of the sheet which slots fit over the raised blisters 5 when the front sheet 19 is folded over the back sheet 17. With this arrangement, the raised blister extends outwardly from the front of the panel assembly 1 where it may be easily observed with the component housed therein.

The plastic sheet 23 is preferably formed of a suitable cellulose base material, such as cellulose acetate or cellulose acetate butyrate. Other type plastic material which is rigid enough to give support for and protect the component can also be used. The preferred thickness of the cellulosic base plastic material is about 10 mil or above.

A thermoplastic adhesive is preferably used to bond the plastic sheet to the cardboard back and front sheets. The adhesive is applied at strategic points on the plastic and cardboard back and front sheets. Care must be taken that the test strips 29 (hereinafter explained) are not adhered to the plastic sheet. Preferably the adhesive is applied on the front along areas above and below the blisters parallel to the perforated lines and along the edges of the plastic sheet. On the back, the adhesive is applied at suitable areas other than the tear strip areas 29 and along the edges.

Under the application of heat and pressure along the areas to which the thermoplastic adhesive has been applied, the back and front cardboard sheets 17 and 19 are adhered to the plastic sheet, whereby the entire unit is sealed together to form a unitary and dust-proof package.

The preferred cardboard used for the package is double-white patent coated sulfur-free board. By being sulfur-free, contamination of the component is avoided. The board is preferably about 18 mil thick.

The plastic sheet 23 is scored along lines 25 which score lines correspond or lie along the perforated seams 15 of the back and front sheets 17 and 19 when the plastic sheet is in position between the front and back sheets.

An important feature of this invention is that the score lines 25 of the plastic sheet 23 must break or separate under an applied tearing force equal to that required to break or separate the perforated seams 15 of the cardboard backing and front sheets 17 and 19. Otherwise, it would not be possible to detach the individual packages 3 from the panel assembly 1.

As seen in FIGURE 3, the score lines 25 of the plastic sheet are interrupted at four points only therealong while the seams 15 of the cardboard have numerous points of connection.

Figure 4:
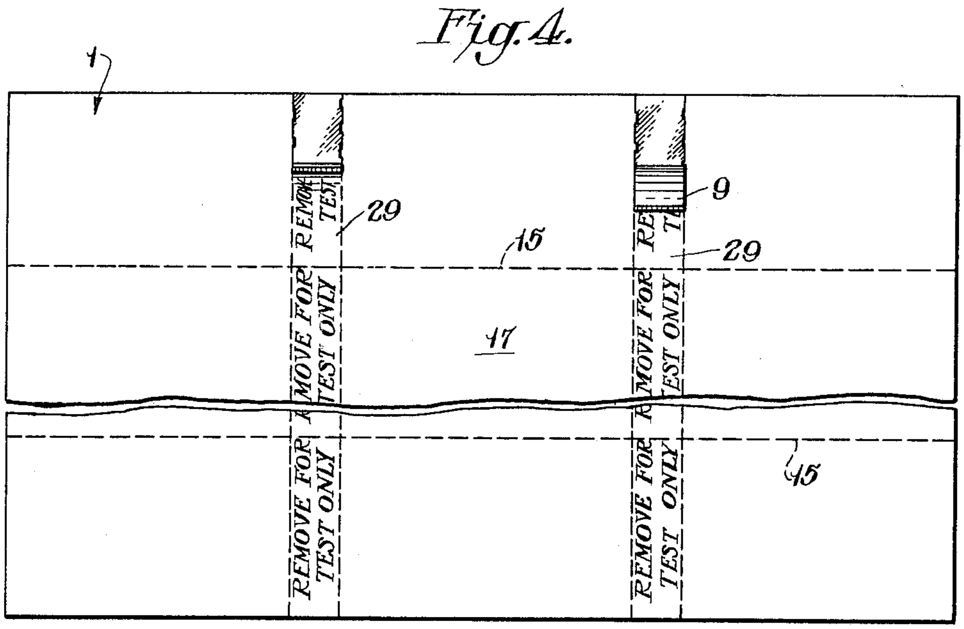
FIGURE 4 is a back view of the panel of FIGURE 1 showing elongated strips which can be removed along their perforated retaining seams to expose portions of the wire leads of the packaged electrical components for testing the electrical components before separating the individual packages from the panel and before removing the components from the separated individual packages.

As seen better in FIGURE 4, but also in FIGURE 3, the back sheet 17 of the panel assembly 1 includes a removable means located adjacent the wire leads and running the length of the sheet whereby when the means is removed the lead wires are exposed for testing purposes. On one hand, this means can be in the form of a pair of removable tear-strips 29 (shown partially removed) which run at right angles to the perforated seams 15. These tear-strips 29 overlie the wire leads of the electrical components housed within the raised blisters 5. After removing the tear strips 29, a suitable dialed testing instrument which is not shown may be moved along the openings left by the tear-strips 29 to contact the wire leads 9. On the other hand, the panel 1 may be moved along a stationary testing apparatus.

On the other hand, the removable means can be a series of punch-out holes overlying the lead wires. Any suitable arrangement can be used which will serve to expose the wire leads for testing purposes.

With the above arrangement, the capacitors may be easily tested at the installation site before they are removed from the package. The tested capacitor can be then moved right up to the point of installation of the electrical circuit before it is removed from the package carrying the identifying characteristics of the capacitor in question. The installer will, therefore, know for certain that he is installing the proper capacitor in the proper location of the electrical system.

Also, the test openings provide finger grips to facilitate the tearing away of the back of the package to free the component from the blister.

When packaging a larger, heavier component, it is necessary to provide some means for holding the component in the blister after it has been placed therein and before the back and front cardboard sheets 17 and 19 have been applied thereto. Also, after the backing sheet 17 is removed to expose the capacitor, some means must be provided to prevent the unit from accidentally falling out of the blister.

Figure 5:
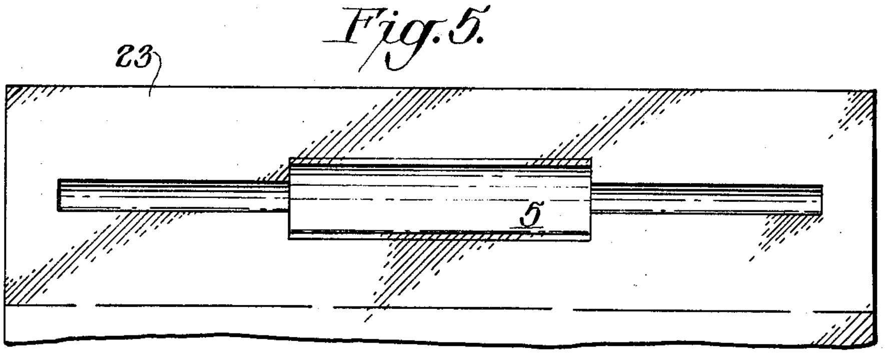
FIGURE 5 is an embodiment of the plastic blister for use with the larger and heavier type components.

To accomplish the above purpose, the vertical walls of the blister 17 accommodating the larger, heavier components are tapered inwardly as they extend from the bottom of the blister as shown in FIGURE 5. To release the component from the blister, the walls are gripped at the top and spread apart.

Figure 6:
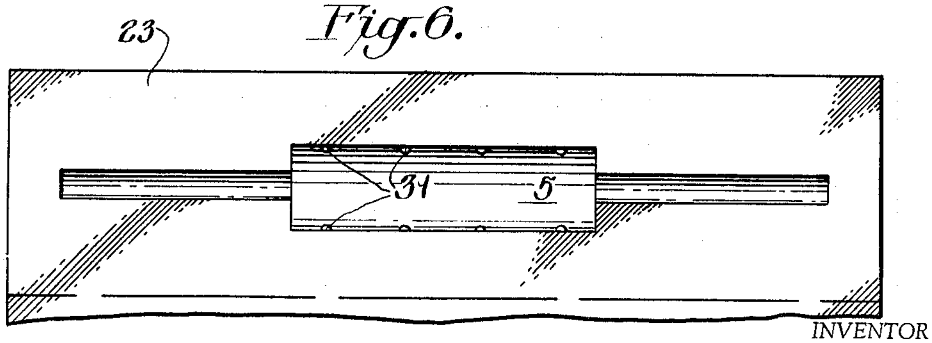
FIGURE 6 is another embodiment of the plastic blister which is also used with the larger type capacitors or other electrical components.

On the other hand, a different form of blister can be used to accomplish this above purpose which is shown in FIGURE 6. There, small spaced-apart beads 31 are formed on that side of the plastic sheet which contacts the capacitor which beads can be formed by indenting the opposite side of the sheet. These beads 31 are so formed that a line of beads is located along each side of the vertical portions of the wall of the blister 5 when viewed from the underside of the sheet and as shown in FIGURE 6. The electrical component becomes slightly wedged with the blister because of the beads 31.

When it is desired to expel the electrical components from the blister, the vertical walls of the blister need only be spread apart slightly to release the components.

It should be pointed out that this bead arrangement is not required for the embodiment shown in FIGURES 1–4 since the capacitor is not at all heavy and will remain within the blister by its slightly wedged fit once it has been inserted therein.

For assembling the panel 1 with the electrical components 7 housed therein, the plastic sheet 23 with the blisters formed therein is placed face down and one electrical component 7 is then placed within each blister with the wire leads 9 lying in the elongated ends of each blister. The plastic sheet is then inverted to a face up position and is laid against backing sheet 17 of the panel assembly 1. At this point, the front sheet 19 is then folded over against the back sheet 17 with the elongated slots 27 in the front sheet fitting over and around the blister 5. Heat and pressure are then applied to the front and back sheets of the assembly 13 at areas along which the thermoplastic adhesive has been applied, whereby they become adhered to the intermediate plastic sheet 23. The panel assembly is now ready for shipping to the user or installer.

For testing the electrical components at the installation the tear tabs 29 in the back panel 17 are removed as explained above.

To remove the individual packages 3 from the panel assembly 1, tearing pressure is applied along the perforated seams 15 of the panel assembly 1. To further remove the electrical components from the individual package 3, the remainder of the back sheet 17 is then removed by applying a stripping force thereto to separate it from the plastic sheet 23. Once the backing is removed the entire component is exposed and may be easily removed from the blisters.

As seen from the above description, a package is provided in which electrical components, such as capacitors, are individually sealed. The capacitor is visible through its transparent blister and any possible contact with foreign matter during shipping and handling is prevented. The component can be tested before it is removed from the package, and the circuit installer will be assured that he is installing the correct size capacitor at the proper location since the identifying characteristics of the component are printed right on the package and since the component need not be removed from the package until it is installed in the circuit. Since the blister material and cardboard are relatively stiff, the component is protected from damage which may be inflicted through normal handling.

Although the invention has been described with respect to the above specific drawings and structure, it is not intended that the invention be restricted thereto. Modifications and changes may be made in the above described assembly and still be within the scope of the following claims.

What is claimed is:

1. A blister type package for individually packaging electrical components having a body structure with end leads extending axially therefrom comprising a backing sheet of relatively rigid material, a front sheet of relatively rigid material, an intermediate transparent sheet of relatively rigid plastic material, spaced raised blisters formed in the plastic sheet corresponding generally to the shape of the components, said electrical components being housed in said blisters, elongated openings in the front sheet which fit over the raised blisters, said front and backing sheets and plastic sheet material forming an adhered together assembly, aligned and perforated tear seams in the front and backing sheets as well as the plastic sheet material which separate adjoining blisters for separating a packaged component from the package forming sheets, and removable continuous tear strips in the backing sheet which strips extend along the backing sheet over the blister areas accommodating the end leads for access to these areas.

2. A blister type package for individually packaging electrical components having a body structure with end leads extending axially therefrom comprising a backing sheet of relatively rigid material, a front sheet of relatively rigid material, an intermediate transparent sheet of relatively rigid plastic material, spaced raised blisters formed in the plastic sheet corresponding generally to the shape of the components, said electrical components being housed in said blisters, elongated openings in the front sheet which fit over the raised blisters, said front and backing sheets and plastic sheet material forming an adhered together assembly, removable continuous tear strips in the backing sheet which strips extend along the backing sheet over the blister areas accommodating the end leads for access to these areas, and aligned and perforated tear seams in the front and backing sheets as well as the plastic sheet material which seams separate adjoining blisters for tearing off a packaged component from the package forming sheets, said perforated tear seams in said plastic sheet material being capable of tearing under an applied force corresponding to that force required for tearing the perforated tear seams in the front and backing sheets.

3. The blister type package according to claim 2 wherein the tear seams for the plastic sheet material have less connecting points than the tear seams for the front and backing sheets.

4. A blister type package for individually packaging electrical components having a body structure with end leads extending axially therefrom comprising a backing sheet of relatively rigid material, a front sheet of relatively rigid material, an intermediate transparent sheet of relatively rigid plastic material, spaced raised blisters formed in the plastic sheet corresponding generally to the shape of the components, said electrical components being housed in said blisters, elongated openings in the front sheet which fit over the raised blisters, said front and backing sheets and plastic sheet material forming an adhered together assembly, aligned and perforated tear seams in the front and backing sheets as well as the plastic sheet material which separate adjoining blisters for separating a packaged component from the package forming sheets, removable continuous tear strips in the backing sheet which strips extend along the backing sheet over the blister areas accommodating the end leads for access to these areas, and retaining means within said blisters for holding said components therewithin.

5. The blister type package according to claim 4 wherein the blister walls taper inwardly for holding the component in place.

6. The blister type package according to claim 4 wherein raised beads extend inwardly of the blister walls to hold the component in place.

7. A blister type package for individually packaging electrical components having a body structure with end leads extending axially therefrom comprising a backing sheet of relatively rigid material, a front sheet of relatively rigid material, an intermediate transparent sheet of relatively rigid plastic material, spaced raised blisters formed in the plastic sheet corresponding generally to the shape of the components, said electrical components being housed in said blisters, elongated openings in the front sheet which fit over the raised blisters, said front and backing sheets and plastic sheet material forming an adhered together assembly, aligned and perforated tear seams in the front and backing sheets as well as the plastic sheet material which separate adjoining blisters for separating a packaged component from the package forming sheets, said perforated tear seams in said plastic sheet material being capable of tearing under an applied force corresponding to that force required for tearing the perforated tear seams in the front and backing sheets, continuous removable tear strips in the backing sheet which strips extend along the backing sheet over the blister areas accommodating the end leads for access to these areas, and retaining means in said blisters for holding said components therewithin.

8. A board package of interconnected individual packages for electrical components having at least two electrodes comprising:

(a) a front sheet;
(b) a back sheet having front and rear surfaces;
(c) an intermediate sheet;
(d) parallel spaced cavities projecting upwardly out of the plane of said intermediate sheet, said cavities generally conforming to the shape of said components and having an open side closed by the front surface of said back sheet;
(e) said electrical components being housed in said cavities;
(f) said front sheet having parallel openings therein aligned with said cavities which openings correspond generally to the shape of said cavities and through which said cavities extend;
(g) said front, back and intermediate sheets being secured together to form a single unit;
(h) parallel and aligned tear seams in the front, back and intermediate sheets which seams are spaced from and parallel to said cavities on either side thereof thereby forming readily separable interconnected individual packages, and
(i) continuous spaced apart tear strips in said back sheet which extend transversely of said tear seams, said tear strips being sufficiently weak at the points adjacent said tear seams whereby the strips are readily separable when an individual package is being separated from the board, said tear strips being disposed over those portions of the cavities in the intermediate sheet whereby only said electrodes are exposed upon removal of said tear strips, the portions of said back sheet remaining in place after removal of the tear strips being readily removable to completely expose the components for easy removal.

References Cited by the Examiner

UNITED STATES PATENTS

| | | | |
|---|---|---|---|
| 1,671,566 | 5/1928 | Baldwin | 220—51 |
| 1,987,545 | 1/1935 | Alexander | 229—7 |
| 2,568,625 | 9/1951 | Harvey | 207—78 |
| 2,720,969 | 10/1955 | Kendall | 206—43 |
| 2,757,793 | 8/1956 | Deitz | 207—78 |
| 2,884,127 | 4/1959 | Neary | 206—80 |
| 2,889,922 | 6/1959 | Clarvoe | 206—56 |
| 2,892,538 | 6/1959 | Middleton | 206—78 |
| 2,892,541 | 6/1959 | Hahn | 206—78 |
| 2,903,139 | 9/1959 | Penman | 206—79 |
| 2,908,383 | 10/1959 | Vogt | 206—65 |
| 2,928,539 | 3/1960 | Chirchiglia | 206—56 |
| 2,971,638 | 2/1961 | Allison. | |
| 2,984,346 | 5/1961 | Holley | 206—56 |
| 2,994,427 | 8/1961 | Mills | 206—78 |
| 3,086,649 | 4/1963 | Johnson | 229—51 |
| 3,088,587 | 5/1963 | Dimmig | 206—78 |

FOREIGN PATENTS

| | | |
|---|---|---|
| 958,491 | 9/1949 | France. |

LOUIS G. MANCENE, *Primary Examiner.*

EARLE J. DRUMMOND, THERON E. CONDON, GEORGE O. RALSTON, *Examiners.*